United States Patent
Park et al.

(10) Patent No.: US 7,359,573 B2
(45) Date of Patent: Apr. 15, 2008

(54) CONTRAST COMPENSATION APPARATUS AND METHOD THEREOF

(75) Inventors: Yung-jun Park, Yongin (KR); Jae-hwan Oh, Suwon (KR); Hyun Kang, Suwon (KR); Seung-joon Yang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 765 days.

(21) Appl. No.: 10/699,658

(22) Filed: Nov. 4, 2003

(65) Prior Publication Data

US 2004/0091169 A1    May 13, 2004

(30) Foreign Application Priority Data

Nov. 7, 2002    (KR) .................. 10-2002-0068898

(51) Int. Cl.
*G06K 9/40* (2006.01)
*G06K 9/00* (2006.01)
*G09G 5/00* (2006.01)

(52) U.S. Cl. .................. 382/274; 382/168; 382/169; 382/254; 345/617

(58) Field of Classification Search ................ 382/168, 382/169, 254, 274
See application file for complete search history.

(56) References Cited

U.S. PATENT DOCUMENTS

| | | | |
|---|---|---|---|
| 5,289,282 A | | 2/1994 | Tsuji et al. |
| 5,294,986 A | | 3/1994 | Tsuji et al. |
| 5,315,389 A | | 5/1994 | Izawa et al. |
| 5,339,368 A | * | 8/1994 | Higgins-Luthman et al. .................. 382/169 |
| 5,414,538 A | * | 5/1995 | Eschbach .................. 358/522 |
| 5,434,931 A | | 7/1995 | Quardt et al. |
| 5,502,776 A | | 3/1996 | Manabe |
| 5,808,697 A | * | 9/1998 | Fujimura et al. .................. 348/672 |
| 5,862,234 A | * | 1/1999 | Todter et al. .................. 381/71.6 |

(Continued)

FOREIGN PATENT DOCUMENTS

EP      0798919 A2    10/1997

(Continued)

OTHER PUBLICATIONS

Chinese Office Action for corresponding application 200310114817.3, dated Jul. 1, 2005.

*Primary Examiner*—Jingge Wu
*Assistant Examiner*—José M Torres
(74) *Attorney, Agent, or Firm*—Staas & Halsey LLP

(57) ABSTRACT

A contrast compensation apparatus and a method thereof utilize a simplified hardware structure and a low contrast distortion. The contrast compensation apparatus includes a pixel value detection unit to detect a distribution of pixel values of respective pixels of an input image signal, a pixel value limit unit having pre-set luminance limit values and re-configuring the distribution of the pixel values of the respective pixels based on the pre-set luminance limit values, and a mapping unit to set luminance for the respective pixels based on a cumulative distribution function with respect to the re-configured pixel values. When certain portions of an image are rendered very bright or dark, the phenomenon in which the entire image becomes abruptly bright or dark is reduced. Further, the contrast compensation apparatus uses the minimum number of multipliers, adders, and subtractors only, thus having an advantage of simplified structure and using less electric power.

19 Claims, 12 Drawing Sheets

U.S. PATENT DOCUMENTS

| | | | |
|---|---|---|---|
| 5,949,918 A * | 9/1999 | McCaffrey | 382/274 |
| 5,982,926 A * | 11/1999 | Kuo et al. | 382/167 |
| 6,130,724 A * | 10/2000 | Hwang | 348/678 |
| 6,259,472 B1 | 7/2001 | Park | |
| 6,463,173 B1 | 10/2002 | Tretter | |
| 6,504,954 B1 * | 1/2003 | Goldstein | 382/168 |
| 6,549,239 B1 * | 4/2003 | Tao | 348/371 |
| 6,658,165 B1 * | 12/2003 | Choi | 382/274 |
| 7,012,625 B1 * | 3/2006 | Kobayashi et al. | 345/690 |
| 7,167,597 B2 * | 1/2007 | Matsushima | 382/274 |
| 2002/0136464 A1 * | 9/2002 | Schu | 382/274 |
| 2003/0099407 A1 * | 5/2003 | Matsushima | 382/274 |

FOREIGN PATENT DOCUMENTS

| | | |
|---|---|---|
| EP | 801360 A2 * | 10/1997 |
| JP | 04-349783 | 12/1992 |
| JP | 06-095632 | 4/1994 |
| JP | 2002-247393 | 8/2002 |

* cited by examiner

CONTRAST COMPENSATION APPARATUS AND METHOD THEREOF

CROSS-REFERENCE TO RELATED APPLICATIONS

This application claims the benefit of Korean Application No. 2002-68898, filed Nov. 7, 2002, in the Korean Intellectual Property Office, the disclosure of which is incorporated herein by reference.

BACKGROUND OF THE INVENTION

1. Field of the Invention

The present invention relates to a contrast compensation apparatus using histogram equalization and a method thereof, and more particularly, to a contrast compensation apparatus having a simplified hardware structure and a low contrast distortion and a method thereof.

2. Description of the Related Art

The basic principle of histogram equalization is to change features of a given image by varying a histogram of the image. A histogram shows a gray-level luminance distribution of an image. Such a gray-level histogram shows ratios of brightness to darkness, that is, contrast ratios, of an image, and the contrast ratios change when the histogram varies. In general, a high contrast ratio renders an image sharp, and a low contrast ratio renders an image blurry.

FIG. 1A and FIG. 1C are views illustrating the contrast concept, and FIG. 1B and FIG. 1D are views illustrating histograms for FIG. 1A and FIG. 1C, respectively.

The views shown in FIG. 1A and FIG. 1C illustrate an image and a contrast-enhanced image by histogram equalization, respectively. As shown in FIGS. 1A and 1C, the distinct luminance contrast between individual pixels forming an image facilitates the recognition of an image. FIG. 1B illustrates a histogram of luminance distribution for the image shown in FIG. 1A. As shown in FIG. 1B, pixels are clustered around an area having a low luminance. Accordingly, the luminance differences among the respective pixels forming the image are small, making the image hardly recognizable. FIG. 1D illustrates a histogram for the image shown in FIG. 1C. The luminance in the histogram illustrated in FIG. 1B is ramified in an expanded form. Accordingly, the respective pixels forming the image have different degrees of luminance, making the image easily recognizable.

FIG. 2 is a block diagram for showing a conventional contrast compensation device. The contrast compensation unit shown in FIG. 2 has a probability density function (PDF) calculation unit 10, a cumulative distribution function (CDF) calculation unit 20, and a mapping unit 30.

The PDF calculation unit 10 detects luminance degrees of respective pixels forming an input image, and calculates a probability density function based on the detection. The probability density function is a function that graphs the number of pixels having a specified luminance.

The CDF calculation unit 20 sequentially accumulates the probability density functions, and then obtains a cumulative distribution. Then, the cumulative distribution function is defined as in Formula 1 as follows:

$$CDF = \sum_{i=0}^{n} PDF(i) \text{ wherein } i = 0, 1, 2, 3 \ldots \quad \text{Formula 1]}$$

The mapping unit 30 tends to map low luminance values of pixels into high luminance values based on a cumulative distribution function obtained by Formula 1 when the overall luminance of an input image is high.

FIG. 3A to FIG. 3H are views illustrating an image compensation process through the contrast compensation device of FIG. 2.

FIG. 3A shows a night mountain image that looks dark on the whole. Accordingly, if a probability density function is expressed based on calculated luminance degrees of respective pixels forming the image of FIG. 3A, a distribution of a plurality of dark colors is seen as shown in FIG. 3B. FIG. 3C shows a cumulative distribution function obtained through Formula 1 for FIG. 3B, and FIG. 3D is obtained when the cumulative distribution function obtained for FIG. 3C is converted into a gray scale of 256 levels. FIG. 3D is used herein to illustrate a mapping function for mapping an image signal. For example, if the input image is dark overall and any one of the pixels forming the input image has 100 gray levels, the mapping unit 30 maps the image to have 80 gray levels.

In the meantime, as shown in FIG. 3E, if the moon C of high luminance emerges on the upper right side between night mountains A and the night sky B on an image, a probability density function is formed as shown in FIG. 3F. The left side of FIG. 3F indicates a distribution of pixels of low luminance, and the right side of the same indicates distribution of pixels of high luminance. A cumulative distribution function obtained for FIG. 3F based on Formula 1 is as shown in FIG. 3G. FIG. 3H is obtained when the accumulative distribution function of FIG. 3G is converted into a 256-level gray scale, and, when FIG. 3H is used as a mapping function, 100 gray levels are mapped into 120 gray levels, because a slope of the cumulative distribution function rapidly increases when the probability density function for the bright moon A is accumulated with the probability density function of FIG. 3F. When FIG. 3H is used as a mapping function, an average luminance of all pixels forming the image increases. That is, not only is the position where the moon C emerges brightened, but the entire image also is brightened. Accordingly, the entire image has a high luminance, and the mountains A, sky B, and moon C become indistinct in luminance therebetween, and thus the image is blurred. That is, contrast ratios are degraded.

SUMMARY OF THE INVENTION

The present invention has been devised to solve the above problem. Thus, an aspect of the present invention is to provide a contrast compensation apparatus having less contrast distortion than conventional hardware and having a simplified hardware structure, and a method thereof.

To achieve the above and/or other aspects, a contrast compensation apparatus comprises a pixel value detection unit to detect a distribution of pixel values of respective pixels of an input image signal; a pixel value limit unit having pre-set luminance limit values, and to reconfigure the distribution of the pixel values of the respective pixels based on the pre-set luminance limit values; and a mapping unit to set a luminance for the respective pixels based on a cumulative distribution function with respect to the re-configured pixel values.

Generally, the pre-set luminance limit values include a first setting value for setting an upper limit of the detected pixel values of the respective pixels; and a second setting value for setting a lower limit of the detected pixel values of the respective pixels.

Typically, the pixel value limit unit includes a first comparison part to compare the pixel values of the respective pixels detected from the pixel value detection unit with a first setting value, and outputting the first setting value when the detected pixel values exceed the first setting value; and a second comparison part to compare the pixel values of the respective pixels detected from the pixel value detection unit with a second setting value, and outputting the second setting value when the detected pixel values of the respective pixels are smaller than the second setting value.

Generally, the first comparison part includes a first buffer having an input terminal from which an image signal is inputted, and an output terminal connected to an output terminal of the first comparison part; a first storage to store the first setting value; and a first comparator to compare the image signal with the first setting value of the first storage, and enable either the first buffer or the first storage based on a result of the comparison.

Typically, the second comparison part includes a second buffer having an input terminal from which an image signal is inputted, and an output terminal connected to an output terminal of the second comparison part; a second storage to store the second setting value; and a second comparator to compare the image signal with the second setting value of the second storage, and enable either the second buffer or the second storage based on a result of the comparison.

Generally, the contrast compensation apparatus further comprises a cumulative distribution function conversion unit provided between the pixel value limit unit and the mapping unit, to convert the image signal based on the Formula as shown below with the cumulative distribution function of pixel values re-configured in the pixel value limit unit:

$$CDF(K) = CDF(K) - \frac{CDF(N)}{N \times K} + K,$$

wherein N is the highest pixel value displayable when the image signal forms an image, and K denotes a pixel value.

To achieve the above and/or other aspects, a contrast compensation method comprises operations of calculating pixel values of an image signal; limiting the calculated pixel values based on pre-set luminance limit values, and re-configuring the calculated pixel values of the image signal; and calculating a cumulative distribution function for the reconfigured pixel values, and setting a contrast of the image signal based on the cumulative distribution function.

Additional aspects and/or advantages of the invention will be set forth in part in the description which follows and, in part, will be obvious from the description, or may be learned by practice of the invention.

Typically, the operation to reconfigure the pixel values includes operations of setting an upper limit value of the calculated pixel values; setting a lower limit value of the calculated pixel values; and mapping pixel values over the upper limit value and pixel values under the lower limit value into the upper limit value and the lower limit value, respectively.

Generally, the operation to set the contrast of the image signal includes operations of converting the cumulative distribution function into a predetermined gray level; and mapping the pixel values of the image signal based on the cumulative distribution function converted to the gray level.

Typically, the mapping operation includes operations of dividing the cumulative distribution function by the number of pixels forming the image signal; and multiplying, by the predetermined gray level, the cumulative distribution function divided by the number of pixels.

Generally, the operation to set the contrast of the image signal further includes an operation of calculating the cumulative distribution function for the pixel values and reconfiguring the cumulative distribution function based on the Formula as shown below:

$$CDF(K) = CDF(K) - \frac{CDF(N)}{N \times K} + K,$$

wherein N is the highest pixel value displayable when the image signal forms an image, and K denotes a pixel value.

BRIEF DESCRIPTION OF THE DRAWINGS

These and/or other aspects and/or advantages of the invention will become apparent and more readily appreciated from the following description of the embodiments, taken in conjunction with the accompanying drawings of which.

DETAILED DESCRIPTION OF THE EMBODIMENTS

Figure 1A:
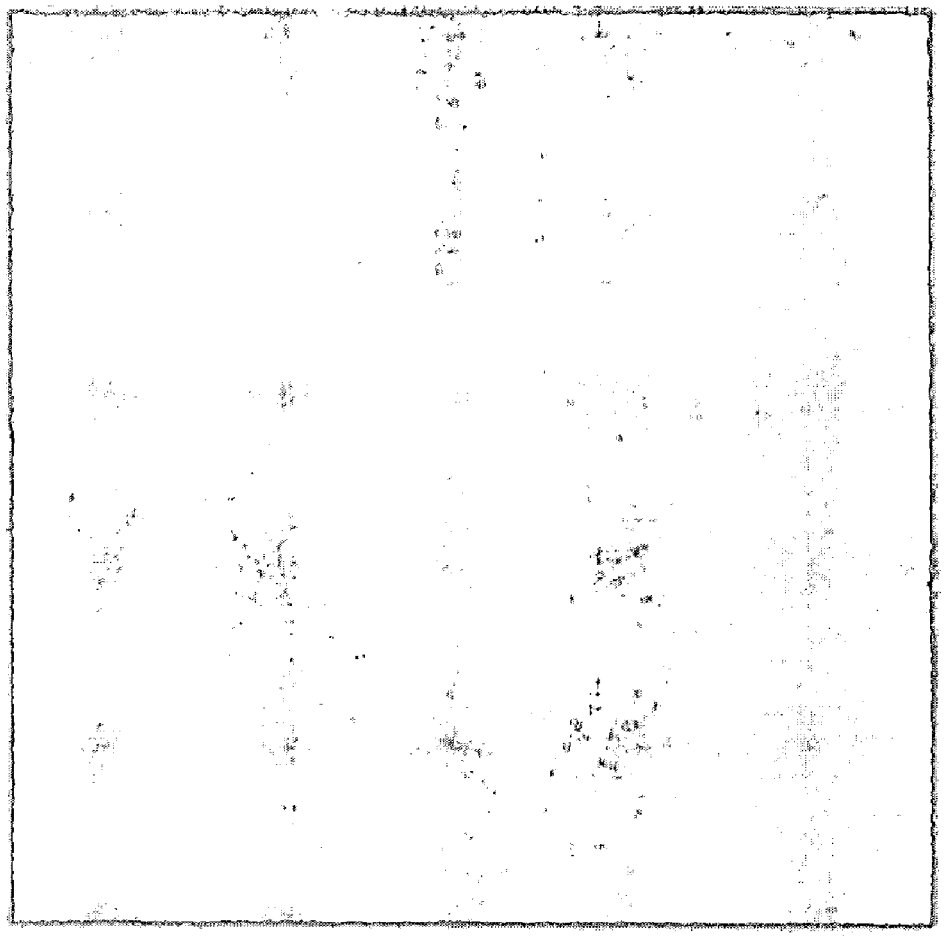
FIG. 1A and FIG. 1C are views to illustrate the contrast concept.
Figure 1B:
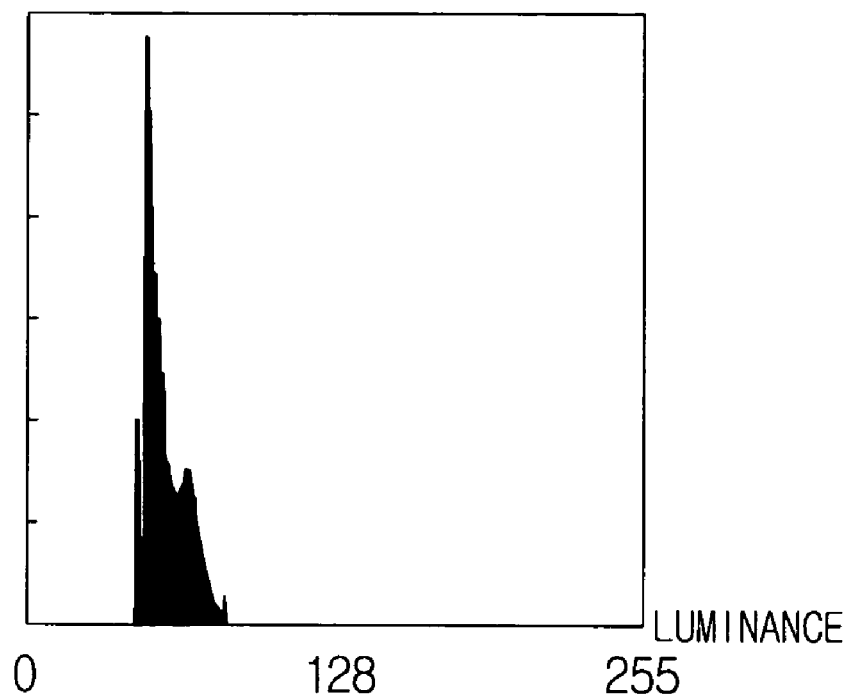
FIG. 1B and FIG. 1D are views illustrating histograms for FIG. 1A and FIG. 1C, respectively.
Figure 1C:
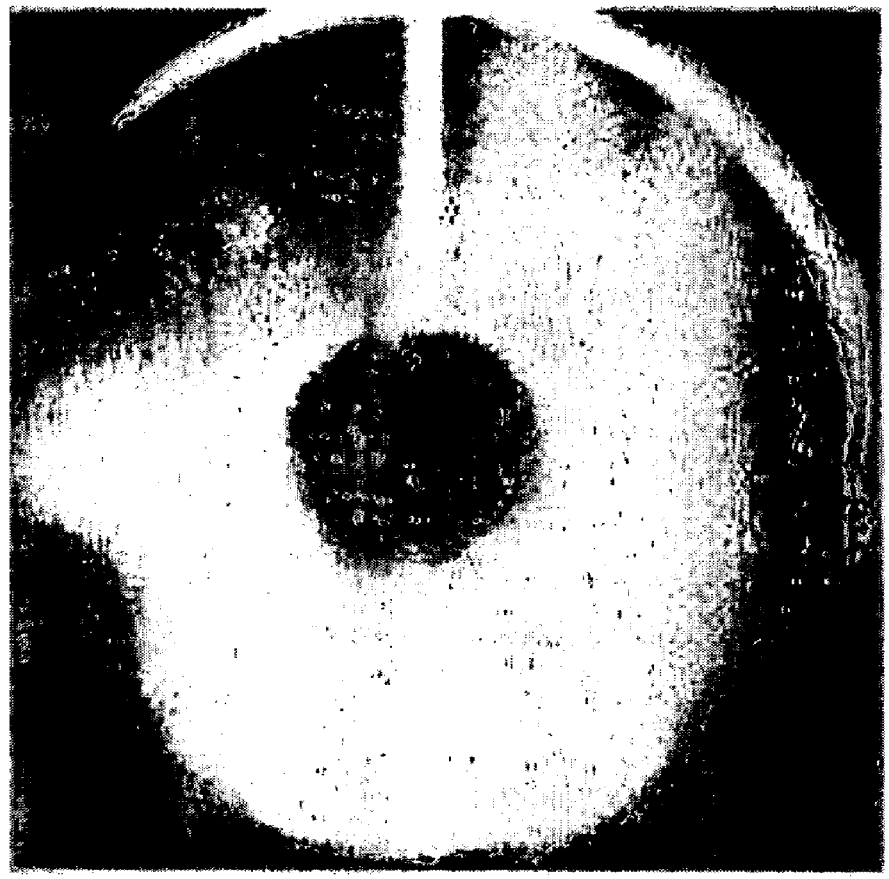
Figure 1D:
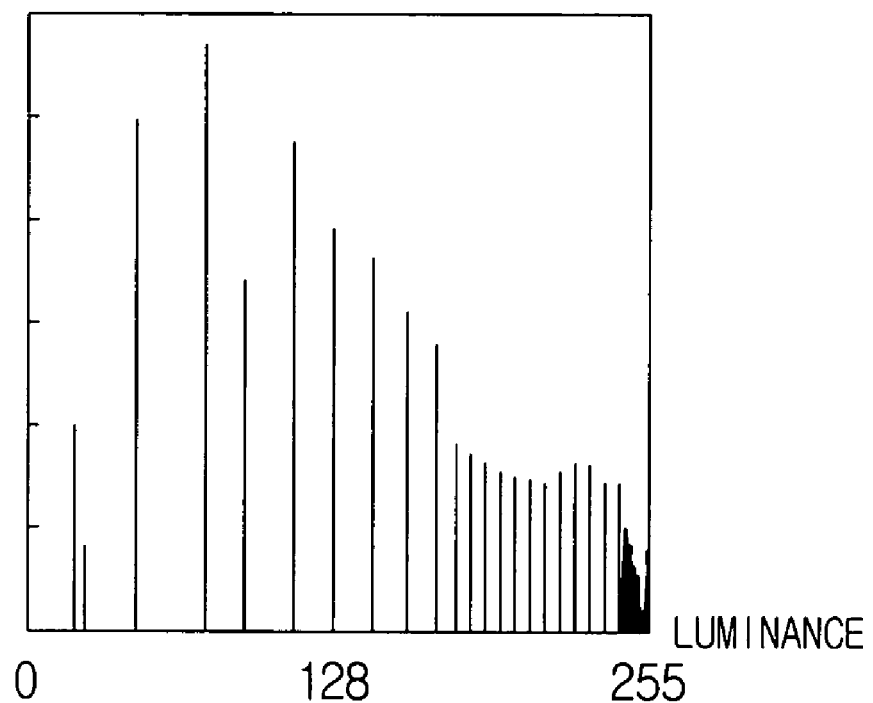
Figure 2:
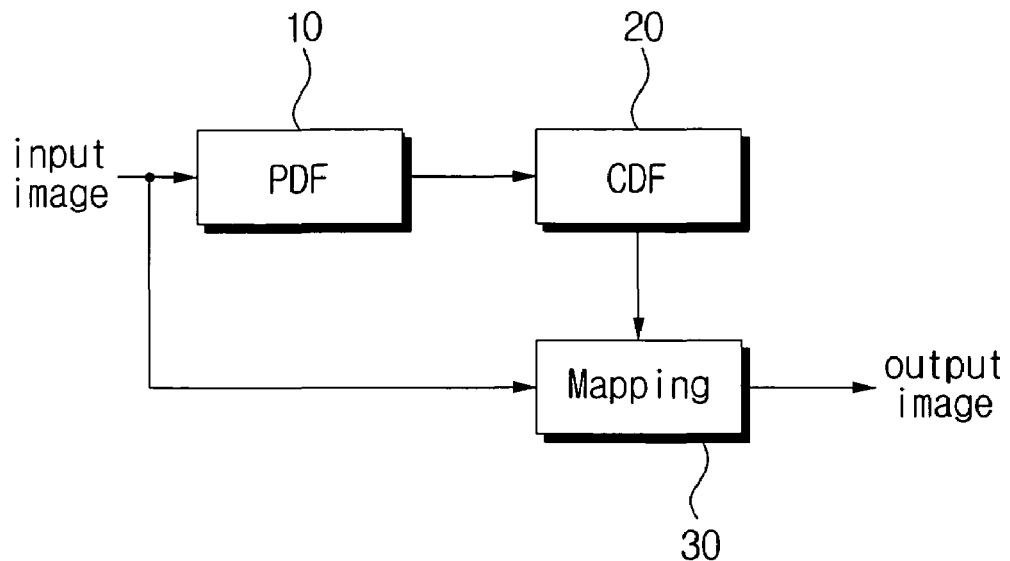
FIG. 2 is a block diagram schematically representing a conventional contrast compensation apparatus.
Figure 3A:
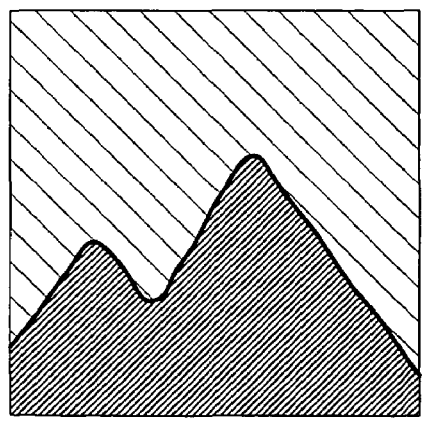
FIG. 3A to FIG. 3H are views to illustrate an image compensation process through the contrast compensation apparatus shown in FIG. 2.
Figure 3B:
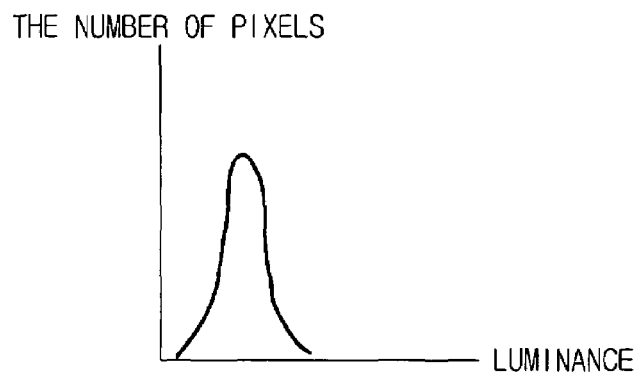
Figure 3C:
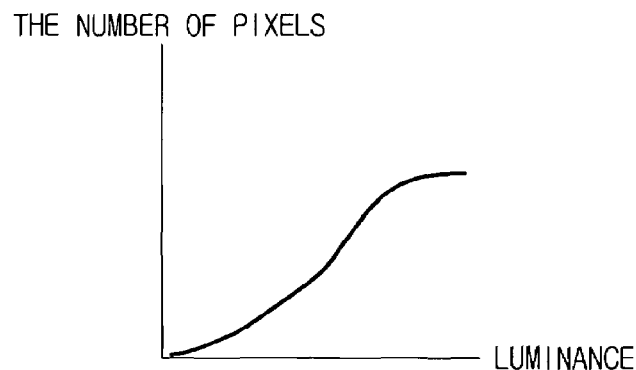
Figure 3D:
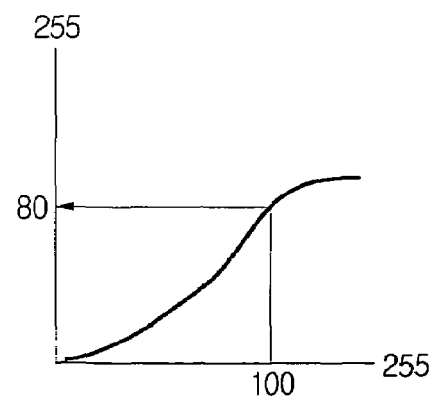
Figure 3E:
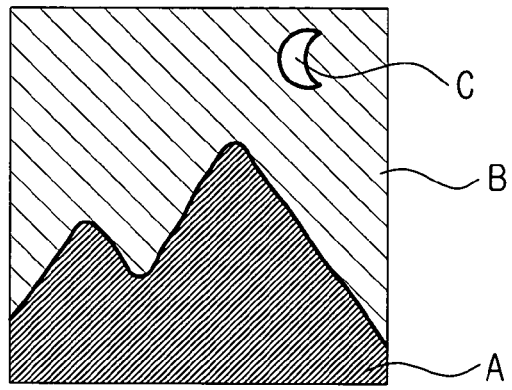
Figure 3F:
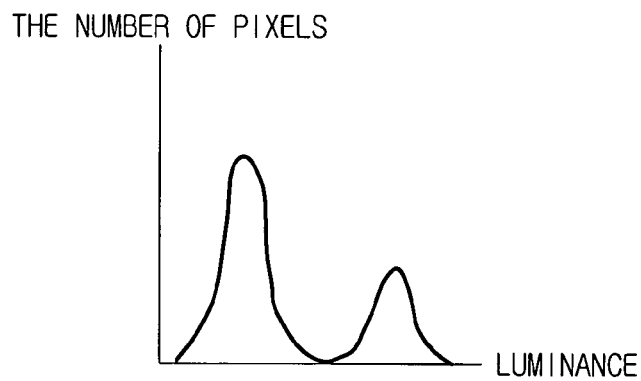
Figure 3G:
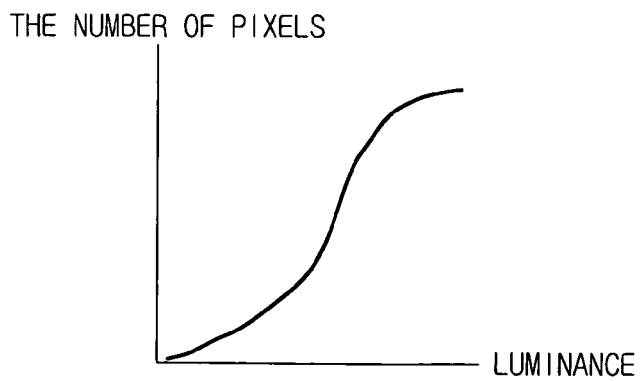
Figure 3H:
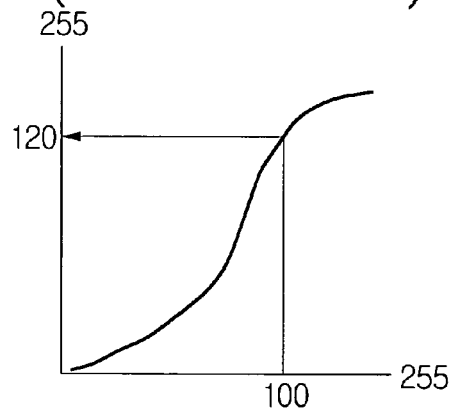

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 4:
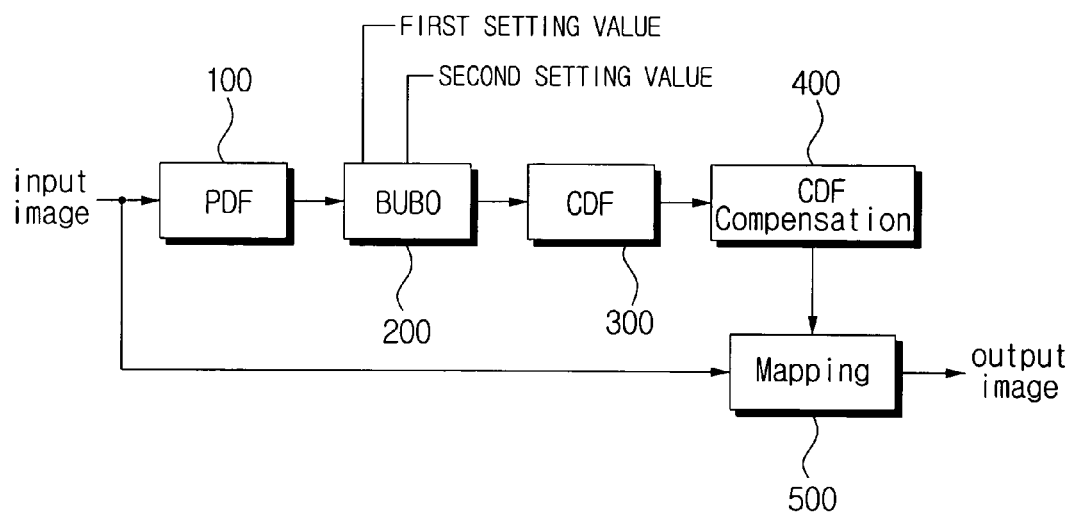
FIG. 4 is a block diagram schematically representing a contrast compensation apparatus according to an embodiment of the present invention.

FIG. 4 is a block diagram schematically representing a contrast compensation apparatus according to an embodiment of the present invention.

The contrast compensation apparatus in the embodiment illustrated in FIG. 4 has a PDF calculation unit 100, a luminance value limit/restraint unit (or Bit Under threshold Bit over threshold (BUBO) unit) 200, a CDF unit 300, a CDF compensation unit 400, and a mapping unit 500.

The PDF unit 100 detects a pixel value distribution of an input image, and calculates a probability density function (PDF) based on the distribution. Herein, the probability density function is defined as in previous Formula 1.

The pixel value can be the luminance value, a grayscale value of three primary colors R, G, B, or a grayscale value of color difference signals Y, Cb, Cr. Representing the grayscale value by 8-bits will render the primary colors R, G, B and the saturation in 256 levels (i.e., $2^8$ levels). The luminance value can also be expressed by 256 levels, and the color difference signals Y, Cb, Cr can be expressed by 8 bits, respectively. Accordingly, the luminance value, grayscale value of the primary color signals and grayscale value of the color difference signal are varied in accordance with the variation of the brightness value by the input image signal, and the PDF corresponding to the variation of luminance of input image signal can be calculated. In the following description, the contrast compensation apparatus according to the present invention will be described mainly with reference to the luminance value of the input image signal. However, it should be noted that the present invention is equally applicable to the grayscale values of the three primary colors R, G, B and the color difference signals.

The BUBO unit 200 contains a first setting value to set over-threshold values (or values over an upper limit value) of the detected luminance value and a second setting value to set under-threshold values (or values under a lower limit value) of the detected luminance value, and maps luminance values over the first setting value or under the second setting value, out of the luminance values detected from the PDF calculation unit 100, into the first setting value or the second setting value. For example, when the first and second setting values are set to a 20-level gray scale and a 200-level gray scale, respectively, for an input image having 256 gray levels (0~255 gray levels), the BUBO unit 200 outputs a 20- to 200-level image as is to the CDF calculation unit 300, whereas the BUBO unit 200 maps the luminance values under 20-level gray scale (for example, 15) into the 20-level gray scale, and luminance values over 200-level gray scale (for example, 210) into the 200-level gray scale, before outputting to the CDF calculation unit 300. By setting the gray scale and luminance values thusly, even though certain image portions have excessively high or low luminance values, the luminance of an entire image may be prevented from being excessively high or low when an image is displayed.

The CDF calculation unit 300 sequentially accumulates and calculates probability density functions outputted from the BUBO unit 200. Then, a cumulative distribution function is defined as in previous Formula 2.

The CDF compensation unit 400 divides a cumulative calculation value outputted from the CDF calculation unit 300 by the number of pixels forming an image to obtain an average value. This process will be described in detail later.

Figure 5:
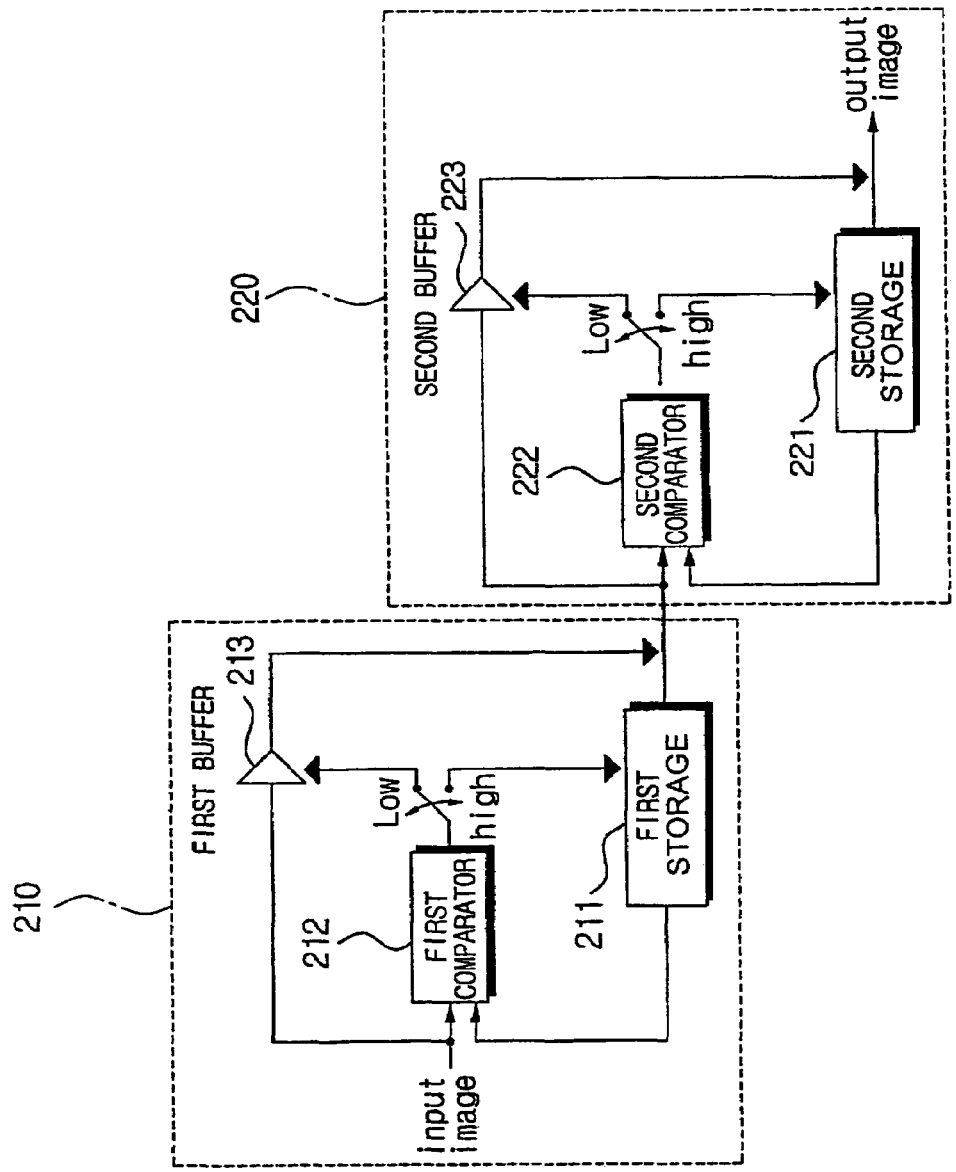
FIG. 5 is a block diagram illustrating a luminance value restraint unit of FIG. 4.

FIG. 5 is an illustrative block diagram for an embodiment of the BUBO unit 200 shown in FIG. 4.

The BUBO unit 200 shown in FIG. 5 has a first comparison part 210 and a second comparison part 220. The first comparison part 210 compares a first setting value with a luminance value detected from the PDF calculation unit 100, and, if the detected luminance value exceeds the first setting value as a result of the comparison, outputs the first setting value. If the detected luminance value does not exceed the first setting value, the first comparison part 210 outputs the detected luminance value to the second comparison part 220.

The second comparison part 220 compares a second setting value with a luminance value detected from the BUBO unit 200, and, if the luminance value is smaller than the second setting value as a result of the comparison, outputs the second setting value. If the luminance value is larger than the second setting value, the detected luminance value is outputted to the CDF calculation unit 300.

Generally, the first comparison part 210 has a first setting value storage (first storage) 211, a first comparator 212, and a first buffer 213. The first setting value storage (first storage) 211 stores a first setting value, and is enabled when logic "high" is outputted from the first comparator 212. The first comparator 212 compares a luminance value detected from the PDF calculation unit 100 with the first setting value stored in the first setting value storage (first storage) 211. If the detected luminance value does not exceed the first setting value as a result of the comparison, the first comparator 212 outputs logic "low". Accordingly, the first buffer 213 is enabled so that the detected luminance value is outputted to the second comparison part 220. If the detected luminance value exceeds the first setting value as a result of the comparison, logic "high" is outputted to enable the first setting value storage (first storage) 211, and the first setting value stored in the first setting value storage (first storage) 211 is outputted to the second comparison unit 220.

The second comparison part 220 has a second setting value storage (second storage) 221, a second comparator 222, and a second buffer 223. The second setting value storage (second storage) 221 stores a second setting value, and is enabled when the second comparator 222 outputs logic "high". The second comparator 222 compares the second setting value with a luminance value outputted from the first comparison part 210. If the applied luminance value is smaller than the second setting value as a result of the comparison, the second comparator 222 outputs logic "low", and, if the applied luminance value is larger than the second setting value, outputs logic "high". Accordingly, if an output value of the second comparator 222 is logic "low", an output value of the first comparison part 210 is outputted from the CDF calculation unit 300, and, if the output value of the second comparator 222 is logic "high", the second setting value is outputted to the CDF calculation unit 300.

Figure 6A:
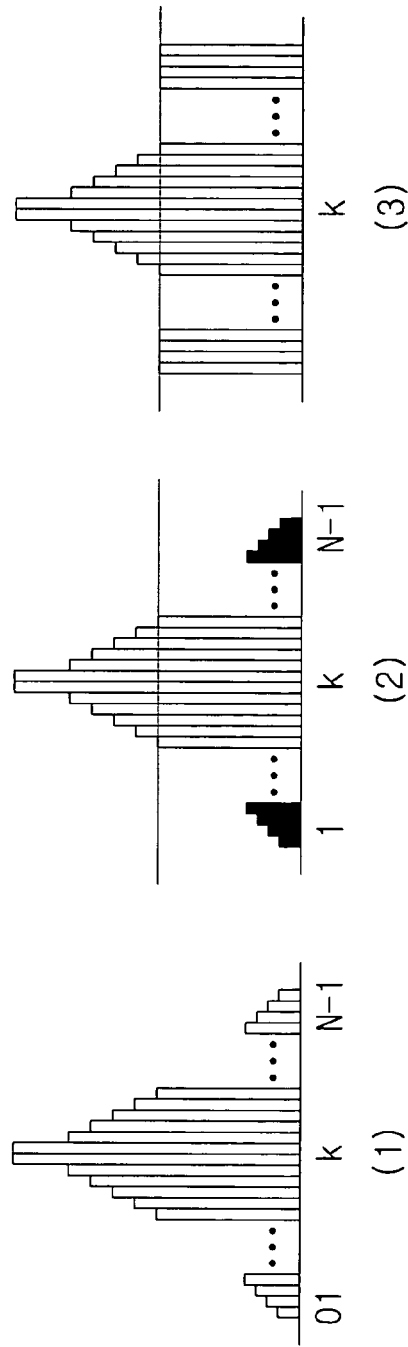
FIG. 6A and FIG. 6B are views illustrating the operation of the luminance value limit unit.
Figure 6B:
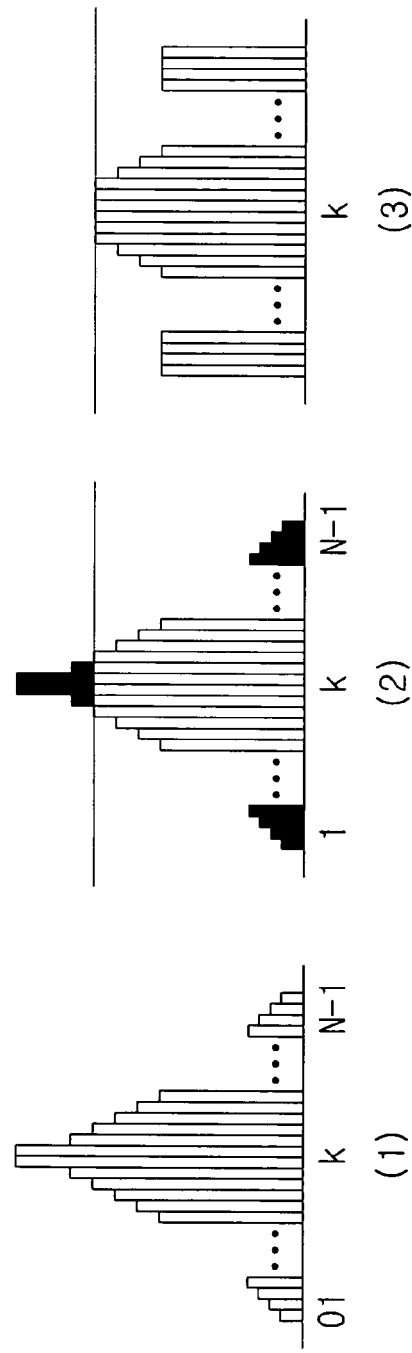

FIG. 6A and FIG. 6B are views schematically illustrating the operation of the first and second comparison parts 210 and 220 in FIG. 5, respectively.

FIG. 6A is a view illustrating the operation of the first comparison part 210 of FIG. 5, wherein (1) of FIG. 6A denotes a probability density function of an image, (2) of FIG. 6A denotes a portion having luminance values larger than a first setting value, and (3) of FIG. 6A denotes mapping the luminance values over the first setting value which have been mapped into the first setting value.

FIG. 6B is a view illustrating operations of the second comparison part 220 of FIG. 4, wherein (1) of FIG. 6B denotes a probability density function of an image, (2) of FIG. 6B denotes luminance values smaller than the second setting value, and (3) of FIG. 6B denotes the luminance values smaller than the second setting value which have been mapped into the second setting value. The contrast compensation apparatus according to the schematics shown in FIG. 6A and FIG. 6B reduces the influence on the luminance of an entire image due to luminance of specified portions forming the image.

Figure 7:
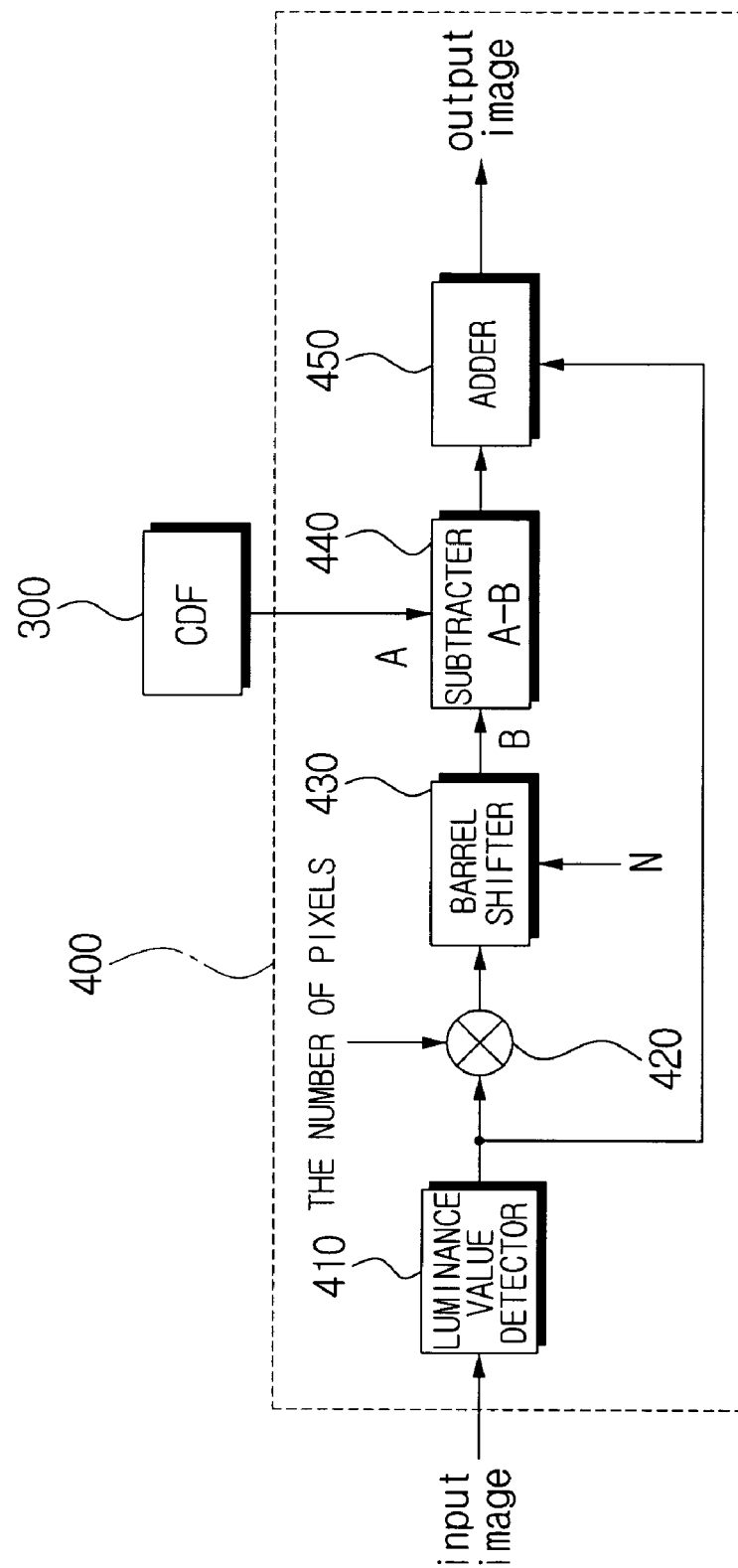
FIG. 7 is a block diagram of the cumulative distribution function compensation unit of FIG. 4.

FIG. 7 is a block diagram illustrating an embodiment of the CDF compensation unit 400 of FIG. 4 in detail. The CDF compensation unit 400 has a luminance value detector 410, a multiplier 420, a barrel shifter 430, a subtractor 440, and an adder 450.

The luminance value detector 410 inputs an image and detects a luminance value of the inputted image. The multiplexer 420 multiplies the luminance value detected from the luminance value detector 410 by the number of pixels used to form a selected image from the inputted image. The barrel shifter 430 shifts an image signal outputted from the multiplexer 420 by the number of luminance (i.e., luminance value), for example, 255, used to form the selected image. The shift operations of the barrel shifter 430 herein act as a divider that divides the output of the multiplexer 420 by the number of the luminance.

The subtractor 440 inputs an output of the CDF calculation unit 300 and an output of the barrel shifter 430, and calculates a difference between the output of the CDF calculation unit 300 and the output of the barrel shifter 430.

The adder 450 adds the luminance value detected from the luminance value detector 410 and the output of the subtractor 440.

Hereinafter, a detailed description will be made with examples of the detailed operations of the present embodiment and the operations of the CDF compensation unit 400 with reference to FIG. 7.

First, in the example below, it is assumed that an image X has a luminance signal distribution as follows:
X={1,1,2,2,2,2,3,3,3,3,4,4,4,4,4,4,4,4,4,4,4,4,4,3,3,3,3,2,2, 2,2,1,1}

Herein, a lowest value of a luminance signal is "1", and the highest value is "4". The luminance values are limited to, for example, 4 kinds for simplicity but, actually, the luminance signal has a 256-level (0~255) luminance.

Next, when the image X having the above luminance distribution is inputted to the PDF calculation unit 100, the probability density functions below are obtained.
PDF{1}=4
PDF{2}=8
PDF{3}=8
PDF{4}=13

The above values indicate that the number of pixels having a luminance value of "1" is 4, the number of pixels having a luminance value of "2" is 8, the number of pixels having a luminance value of "3" is 8, and the number of pixels having a luminance value of "4" is 13.

Further, when the probability density functions are inputted to the CDF calculation unit 200, the cumulative distribution functions below are obtained.
CDF{1}=4
CDF{2}=12
CDF{3}=20
CDF{4}=33

That is, CDF{2}=PDF{1}+PDF{2}, CDF{4}=PDF{1}+PDF{2}+PDF{3}+PDF{4}.

The CDF compensation unit 400 converts the cumulative distribution functions obtained in the above process through Formula 2 as follows:

$$CDF(K) = CDF(K) - \frac{CDF(N)}{N \times K} + K \qquad \text{Formula 2]}$$

Herein, N is the highest luminance value displayable when the image signal forms an image, that is, for the luminance value of N=4, K denotes a luminance value ranging from 1 to 4 in this example.

The cumulative distribution functions can be re-configured according to Formula 2 as follows:

CDF{1}=(4−33/(4×1))+1=−3.25

CDF{2}=(12−33/(4×2))+2=−2.50

CDF{3}=(20−33/(4×3))+3=−1.75

CDF{4}=(33−33/(4×4))+4=+4.00

Herein, under the assumption that negative numbers (−3.25, −2.50, −1.75) are respectively mapped into a positive number "1", re-configured cumulative distribution functions (hereinafter, referred to as Look Up Table (LUT)) are as follows:
LUT{1}=1
LUT{2}=1
LUT{3}=1
LUT{4}=4

The cumulative distribution functions re-configured as above are stored in the mapping unit 500 as a look-up table Then, the contrast compensation apparatus maps and outputs luminance values of an image signal according to the reconfigured cumulative distribution functions. For example, if the luminance values of an image signal are 1, 2, and 3, the values are mapped to a luminance value "1" for outputs, and a luminance value "4" is outputted only when the luminance value of an image signal is "4". Accordingly, when an image signal is converted into an image, the entire image does not become bright even though the image mainly has the high luminance value "4", which would degrade its contrast ratio.

In the meantime, the implementation of Formula 2 in hardware requires an adder, a subtractor, a multiplier, and a divider, but the barrel shifter 430 is used as the divider in implementing the contrast compensation apparatus, so that the hardware structure is greatly reduced. A shift amount in the barrel shifter 430 is decided based on a displayable maximum luminance value "N", and, upon general contrast compensation, the value "N" becomes "255".

Figure 8:
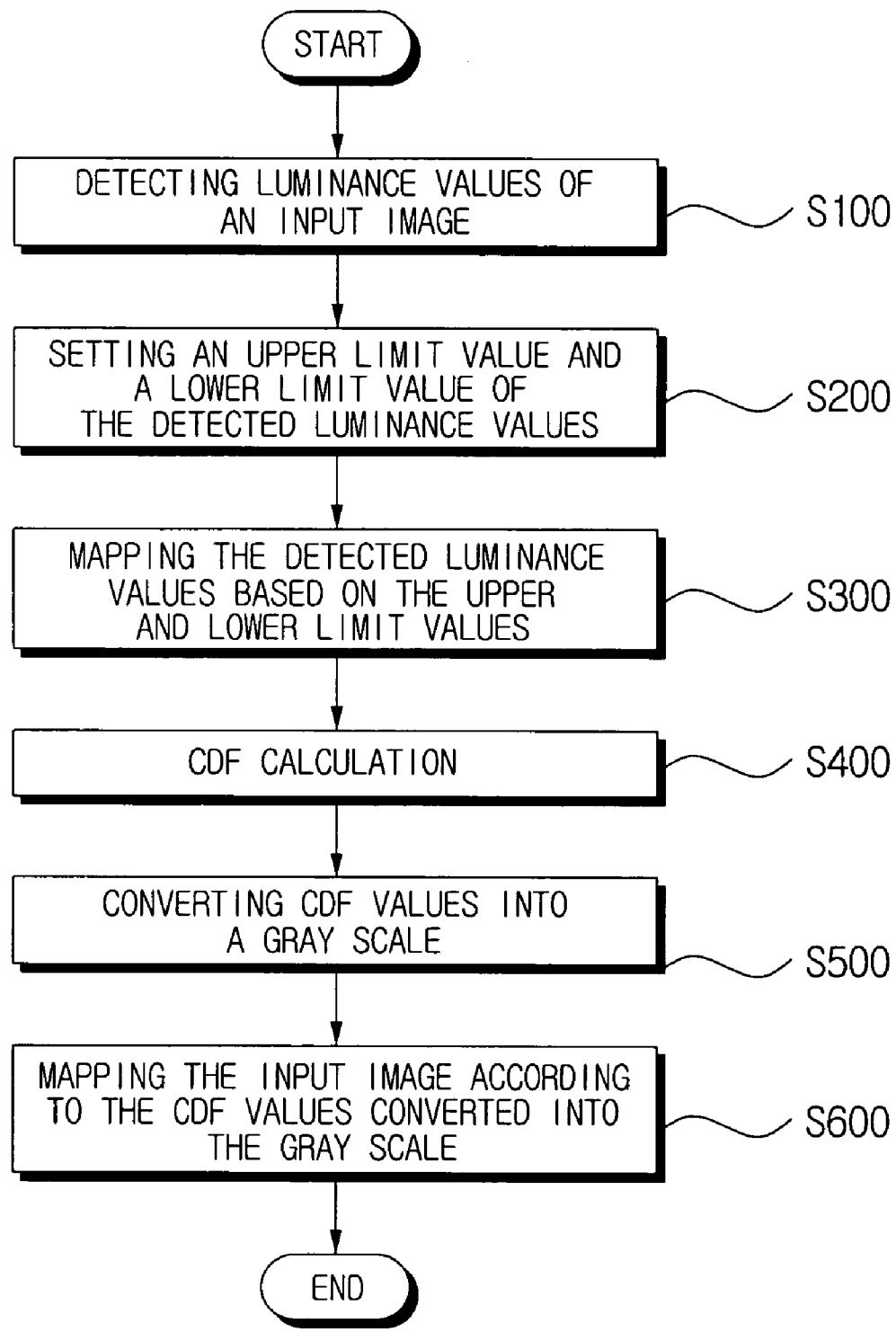
FIG. 8 is a flow chart to show a contrast compensation method according to an embodiment of the present invention.

FIG. 8 is a flow chart illustrating operations of a contrast compensation method according to an embodiment of the present invention.

First, the PDF calculation unit 100 detects pixel values of an inputted image signal, and calculates probability density functions based on the pixel values (S100). The pixel value can be the luminance value, a grayscale value of three primary colors R, G, B, or a grayscale value of color difference signals Y, Cb, Cr. Representing the grayscale value by 8-bits will render the primary colors R, G, B and the saturation in 256 levels (i.e., $2^8$ levels). The luminance value can also be expressed by 256 levels, and the color difference signals Y, Cb, Cr can be expressed by 8 bits, respectively. Accordingly, the luminance value, grayscale value of the primary color signals and grayscale value of the color difference signal are varied in accordance with the variation of the luminance value by the input image signal, and the PDF corresponding to the variation of luminance of input image signal can be calculated. In the following description, the contrast compensation apparatus according to the present invention will be described mainly with reference to the luminance value of the input image signal. However, it should be noted that the present invention is equally applicable to the grayscale values of the three primary colors R, G, B and the color difference signals.

Next, an over-threshold value and an under-threshold value are set to remove luminance values such as "0" or "255" that greatly affect the luminance values of an entire image compared to a portion occupied on the image, that is, luminance values rendering the image excessively dark or bright (S200). The over-threshold values and the under-threshold values may be set to 10% from the highest luminance value and 10% from the lowest luminance value, respectively, but such values are not fixed, but vary when an image is rendered dark or bright. Herein, when luminance values of an image signal exceed the upper limit value, the values are mapped to the upper limit value, and, when luminance values of an image signal are smaller than the lower limit value, the luminance values are mapped to the lower limit value (S300). Accordingly, the image luminance does not become dominated by a specific luminance value. Next, probability density functions having luminance limited by the upper limit value and the lower limit value are sequentially added, and a probability distribution function is obtained (S400). Thereafter, the obtained probability distribution function is converted into a gray scale (S500). Last, the luminance of an image signal is mapped based on a gray scale probability distribution function (hereinafter, referred to as LUT) for outputs. The conversion method into a gray scale and the mapping method based on the probability distribution function (LUT) are well-known technologies, so descriptions will be omitted. Accordingly, when certain portions of an image are rendered very bright or dark, the phenomenon in which the entire image becomes bright or dark may be reduced by the upper limit value and the lower limit value.

As stated above, when certain portions of an image are rendered very bright or dark, the phenomenon in which the entire image becomes abruptly bright or dark is reduced, thus decreasing the contrast degradation of the image. Further, the contrast compensation apparatus only uses the minimum number of multipliers, adders, and subtractors, so that the structure is simplified, and less electric power is consumed when the apparatus is implemented in hardware.

In an embodiment, a computer-readable medium has stored thereon computer-executable instructions of a contrast compensation method, comprising: calculating pixel values of an image signal; limiting the calculated pixel values based on pre-set luminance limit values, and re-configuring the calculated pixel values of the image signal; and calculating a cumulative distribution function to reconfigure the calculated pixel values, and setting a contrast of the image signal based on the cumulative distribution function.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A contrast compensation apparatus, comprising:
    a pixel value detection unit to detect a distribution of pixel values of respective pixels of an input image signal;
    a pixel value limit unit having pre-set luminance limit values and being coupled to the pixel value detection unit, re-configuring the distribution of the pixel values of the respective pixels based on the pre-set luminance limit values;
    a mapping unit, coupled to the pixel value limit unit, to set a luminance of the respective pixels based on a cumulative distribution function with respect to the re-configured pixel values, and
    a cumulative distribution function conversion unit located between the pixel value limit unit and the mapping unit, converting the image signal based on the Formula below with the cumulative distribution function of pixel values re-configured in the pixel value limit unit:

$$CDF(K) = CDF(K) - \frac{CDF(N)}{N \times K} + K,$$

wherein N is a highest pixel value displayable when the image signal forms an image, and K denotes a pixel value.

2. The contrast compensation apparatus as claimed in claim 1, wherein the pre-set luminance limit values include:
    a first setting value to set an upper limit of the detected pixel values of the respective pixels; and
    a second setting value to set a lower limit of the detected pixel values of the respective pixels.

3. The contrast compensation apparatus as claimed in claim 2, wherein the pixel value limit unit includes:
    a first comparison part to compare the pixel values of the respective pixels detected from the pixel value detection unit with the first setting value, and to output the first setting value when the detected pixel values exceed the first setting value; and
    a second comparison part to compare the pixel values of the respective pixels detected from the pixel value detection unit with the second setting value, and to output the second setting value when the detected pixel values of the respective pixels are smaller than the second setting value.

4. The contrast compensation apparatus as claimed in claim 3, wherein the first comparison part includes:
    a first buffer having an input terminal from which an image signal is inputted, and an output terminal connected to an output terminal of the first comparison part;
    a first storage to store a first setting value; and
    a first comparator to compare the image signal with the first setting value of the first storage, and, based on a result of the comparison, enable one of:
        the first buffer so that the detected pixel value is outputted to the second comparison part; and
        the first storage so that the first setting value is outputted to the second comparison part.

5. The contrast compensation apparatus as claimed in claim 4, wherein the second comparison part includes:
    a second buffer having an input terminal to receive output from the first comparison part, and an output terminal connected to an output terminal of the second comparison part;
    a second storage to store a second setting value; and
    a second comparator to compare the output from the first comparison part with the second setting value of the second storage, and, based on a result of the comparison, to enable one of:
        the second buffer so that the output value of the first comparison part is outputted from the pixel value limit unit; and
        the second storage so that the second setting value is outputted from the pixel value limit unit.

6. The contract compensation apparatus as claimed in claim 1, wherein the pixel value is one among the brightness value, a grayscale value of three primary colors R, G, B and a grayscale value of color difference signals Y, Cb, Cr.

7. A contrast compensation method, comprising:
    calculating pixel values of an image signal;
    limiting the calculated pixel values based on pre-set luminance limit values, and re-configuring the calculated pixel values of the image signal; and
    calculating a cumulative distribution function to reconfigure the calculated pixel values, and setting the contrast of the image signal based on the cumulative distribution functions,
    wherein the setting the contrast of the image signal includes calculating the cumulative distribution function of the calculated pixel values and re-configuring the cumulative distribution function based on a Formula as set forth below:

$$CDF(K) = CDF(K) - \frac{CDF(N)}{N \times K} + K$$

where N is a highest pixel value displayable when the image signal forms an image, and K denotes a pixel value.

8. The contrast compensation method as claimed in claim 7, wherein the operation of re-configuring the calculated pixel values comprises:
setting an upper limit value of the calculated pixel values;
setting a lower limit value of the calculated pixel values; and
mapping the calculated pixel values greater than the upper limit value and the calculated pixel values less than the lower limit value into the upper limit value and the lower limit value, respectively.

9. The contrast compensation method as claimed in claim 8, wherein the setting of the contrast of the image signal further comprises:
converting the cumulative distribution function into a predetermined gray level; and
mapping the calculated pixel values of the image signal based on the cumulative distribution function converted to the predetermined gray level.

10. The contrast compensation method as claimed in claim 9, wherein the mapping operation comprises:
dividing the cumulative distribution function by a number of pixels forming the image signal; and
multiplying by the predetermined gray level, the cumulative distribution function divided by the number of pixels.

11. The contrast compensation method as claimed in claim 7, wherein the pixel value is one among the brightness value, a grayscale value of three primary colors R, G, B and a grayscale value of color difference signals Y, Cb, Cr.

12. A computer-readable medium, having stored thereon computer-executable instructions of a contrast compensation method, comprising:
calculating pixel values of an image signal;
limiting the calculated pixel values based on pre-set luminance limit values, and re-configuring the calculated pixel values of the image signal;
calculating a cumulative distribution function to reconfigure the calculated pixel values, and
setting the contrast of the image signal based on the cumulative distribution function,
wherein the setting the contrast of the image signal includes calculating the cumulative distribution function of the calculated pixel values and re-configuring the cumulative distribution function based on a Formula as set forth below:

$$CDF(K) = CDF(K) - \frac{CDF(N)}{N \times K} + K$$

where N is a highest pixel value displayable when the image signal forms an image, and K denotes a pixel value.

13. The computer-readable medium as claimed in claim 12, wherein the operation of calculating a cumulative distribution function to reconfigure the calculated pixel values comprises:
setting an upper limit value of the calculated pixel values;
setting a lower limit value of the calculated pixel values; and
mapping the calculated pixel values greater than the upper limit value and the calculated pixel values less than the lower limit value into the upper limit value and the lower limit value, respectively.

14. The computer-readable medium as claimed in claim 12, wherein the operation of setting the contrast of the image signal further comprises:
converting the cumulative distribution function into a predetermined gray level; and
mapping the calculated pixel values of the image signal based on the cumulative distribution function converted to the predetermined gray level.

15. The computer-readable medium as claimed in claim 14, wherein the mapping operation comprises:
dividing the cumulative distribution function by a number of pixels forming the image signal; and
multiplying, by the predetermined gray level, the cumulative distribution function divided by the number of pixels.

16. A computer-readable medium, having stored thereon computer-executable instructions of a contrast compensation method, comprising:
calculating pixel values of an image signal;
limiting the calculated pixel values based on pre-set luminance limit values, and re-configuring
the calculated pixel values of the image signal; and
calculating a cumulative distribution function to reconfigure the calculated pixel values, and
setting the contrast of the image signal based on the cumulative distribution function,
wherein the operation of setting the contrast of the image signal further includes calculating the cumulative distribution function of the calculated pixel values and re-configuring the cumulative distribution function based on a Formula as set forth below:

$CDF(K)=CDF(K)-CDF(N)/N \times K+K$ where N is a highest pixel value displayable when the image signal forms an image, and K denotes a pixel value.

17. A contrast compensation apparatus, comprising:
a probability density function (PDF) calculation unit, to detect a pixel value of respective pixels of an input image;
a Bit Under threshold Bit Over threshold (BUBO) unit, coupled to the PDF calculation unit, to set one of a first setting value and a second setting value based on the luminance degree of the respective pixels and output resulting probability functions;
a cumulative distribution function (CDF) unit, coupled to the BUBO unit, to accumulate the probability functions outputted from the BUBO unit sequentially;
a CDF compensation unit, coupled to the CDF unit, to reconfigure the accumulated probability functions according to a predetermined luminance adjustment that reduces an influence on a total luminance of an output image due to luminance of predetermined portions forming the output image and convert the image signal based on the Formula below with the cumulative distribution function of reconfigured pixel values:

$CDF(K)=CDF(K)-CDF(N)/N \times K+K$, wherein N is a highest pixel value displayable of the image, and K denotes a pixel value; and a mapping unit, coupled to the CDF compensation unit and to receive the input image, to store reconfigured CDFs and map and output pixel values of the input image according to the reconfigured CDFs.

18. The contrast compensation apparatus of claim 17, wherein the BUBO unit comprises:

a first comparison unit, coupled to the PDF calculation unit, to compare a first setting value with the pixel value detected by the PDF calculation unit, wherein if the pixel value is greater than or equal to the first selling value, the first comparison unit outputs the first setting value; and if the pixel value is less than the first setting value, the first comparison unit outputs the pixel value; and a second comparison unit, coupled to the first comparison unit, to compare a second setting value with the pixel value from the first comparison unit, wherein if the pixel value is less than or equal to the second setting value, the second comparison unit outputs the second setting value; and if the pixel value is greater than the second setting value, the second comparison unit outputs the pixel value to the CDF unit.

19. The contrast compensation apparatus of claim 18, wherein the CDF compensation unit, comprises:

a pixel value detector, arranged to receive the input image, to detect a pixel value of the input image;

a multiplier, coupled to the pixel value detector, to multiply the pixel value detected by a number of pixels used to form a selected image from the input image to provide an image signal;

a barrel shifter, coupled to the multiplier, to shift the image signal by a predetermined pixel value used to form the selected image;

a subtractor, coupled to the CDF unit and to the barrel shifter, to calculate a difference between an output of the CDF unit and an output of the barrel shifter; and an adder, coupled to the subtractor and to the pixel value detector, to add the pixel value and an output of the subtractor.

* * * * *

UNITED STATES PATENT AND TRADEMARK OFFICE
CERTIFICATE OF CORRECTION

PATENT NO. : 7,359,573 B2
APPLICATION NO. : 10/699658
DATED : April 15, 2008
INVENTOR(S) : Yung-jun Park et al.

It is certified that error appears in the above-identified patent and that said Letters Patent is hereby corrected as shown below:

Column 10, Line 53, change "contract" to --contrast--.

Column 10, Line 65, change "functions," to --function,--.

Column 12, Line 43, change "$CDF(K)=CDF(K)-CDF(N)/N*K+K$" to $$-- \quad CDF(K) = CDF(K) - \frac{CDF(N)}{N \times K} + K \quad --.$$

Column 12, Line 67, change "$CDF(K)=CDF(K)-CDF(N)/N*K+K$" to $$-- \quad CDF(K) = CDF(K) - \frac{CDF(N)}{N \times K} + K, \quad --.$$

Column 13, Line 13, change "selling" to --setting--.

Signed and Sealed this

Twenty-ninth Day of September, 2009

David J. Kappos
*Director of the United States Patent and Trademark Office*